United States Patent [19]

Kirihara et al.

[11] Patent Number: 5,009,751
[45] Date of Patent: * Apr. 23, 1991

[54] PROCESS FOR SEPARATION OF HAFNIUM TETRACHLORIDE FROM ZIRCONIUM TETRACHLORIDE

[75] Inventors: Tomoo Kirihara; Ippei Nakagawa, both of Aichi; Yoshinobu Seki, Ibaraki; Yutaka Honda, Ibaraki; Yasuo Ichihara, Ibaraki, all of Japan

[73] Assignee: Mitsubishi Nuclear Fuel Company, Ltd., Tokyo, Japan

[*] Notice: The portion of the term of this patent subsequent to May 15, 2007 has been disclaimed.

[21] Appl. No.: 293,791

[22] Filed: Jan. 5, 1989

[30] Foreign Application Priority Data

Jan. 12, 1988 [JP] Japan .................................. 63-4416

[51] Int. Cl.⁵ ...................... C01G 25/04; C01G 27/04; C25B 1/00
[52] U.S. Cl. ......................................... 204/61; 423/492
[58] Field of Search ........................ 423/492, DIG. 12; 204/61

[56] References Cited

U.S. PATENT DOCUMENTS

| 679,997 | 8/1901 | Scholl | 204/61 |
| 2,791,485 | 5/1957 | Newnham | 423/73 |
| 2,894,886 | 7/1959 | Wainer | 423/492 |
| 3,725,221 | 4/1973 | Gomes | 204/61 |
| 4,857,155 | 8/1989 | Kirihara et al. | 204/61 |
| 4,865,695 | 9/1989 | Snyder et al. | 423/492 |
| 4,874,475 | 10/1989 | McLaughlin et al. | 423/492 |
| 4,925,537 | 5/1990 | Kirihara et al. | 204/61 |

FOREIGN PATENT DOCUMENTS

| 611153 | 12/1960 | Canada | 204/61 |
| 627327 | 9/1961 | Canada | 204/61 |
| 6044119 | 3/1968 | Japan | 423/492 |
| 708595 | 5/1954 | United Kingdom | 204/61 |

Primary Examiner—Michael L. Lewis
Assistant Examiner—Brian M. Bolam
Attorney, Agent, or Firm—James Creighton Wray

[57] ABSTRACT

Separation of hafnium tetrachloride from zirconium tetrachloride by introducing zirconium tetrachloride containing about 2-4 wt percent of hafnium tetrachloride into an electrolytic cell filled with a molten salt and dissolving it to make an electrolytic bath. Running first phase electrolysis which produces zirconium trichloride containing a lower hafnium content than the dissolved zirconium tetrachloride at the cathode. Running second phase electrolysis using the first cathode, but switching the first cathode to become an anode and using a second cathode. Producing zirconium trichloride of a lower hafnium content than the dissolved zirconium tetrachloride at the second cathode. Evolving a gaseous zirconium trichloride at the anode by electrolytic oxidation of the zirconium trichloride produced in the first phase electrolysis. Recovering this evolved zirconium tetrachloride which has a lower hafnium content than the dissolved zirconium tetrachloride and the zirconium trichloride produced at the cathodes. Continuing this second phase electrolysis by changing over polarities of the cathode and the anode, when the concentration of zinc trichloride at the anode decreases to a predetermined concentration when the vapor pressure valve of hafnium tetrachloride, which has become concentrated in the electrolytic bath reaches about 1/10 of that of zirconium tetrachloride in the electrolytic bath. Transferring the hafnium enriched electrolytic bath to a separate vessel and separating it from the molten salt by raising the temperature of the electrolytic bath to a predetermined temperature.

6 Claims, 3 Drawing Sheets

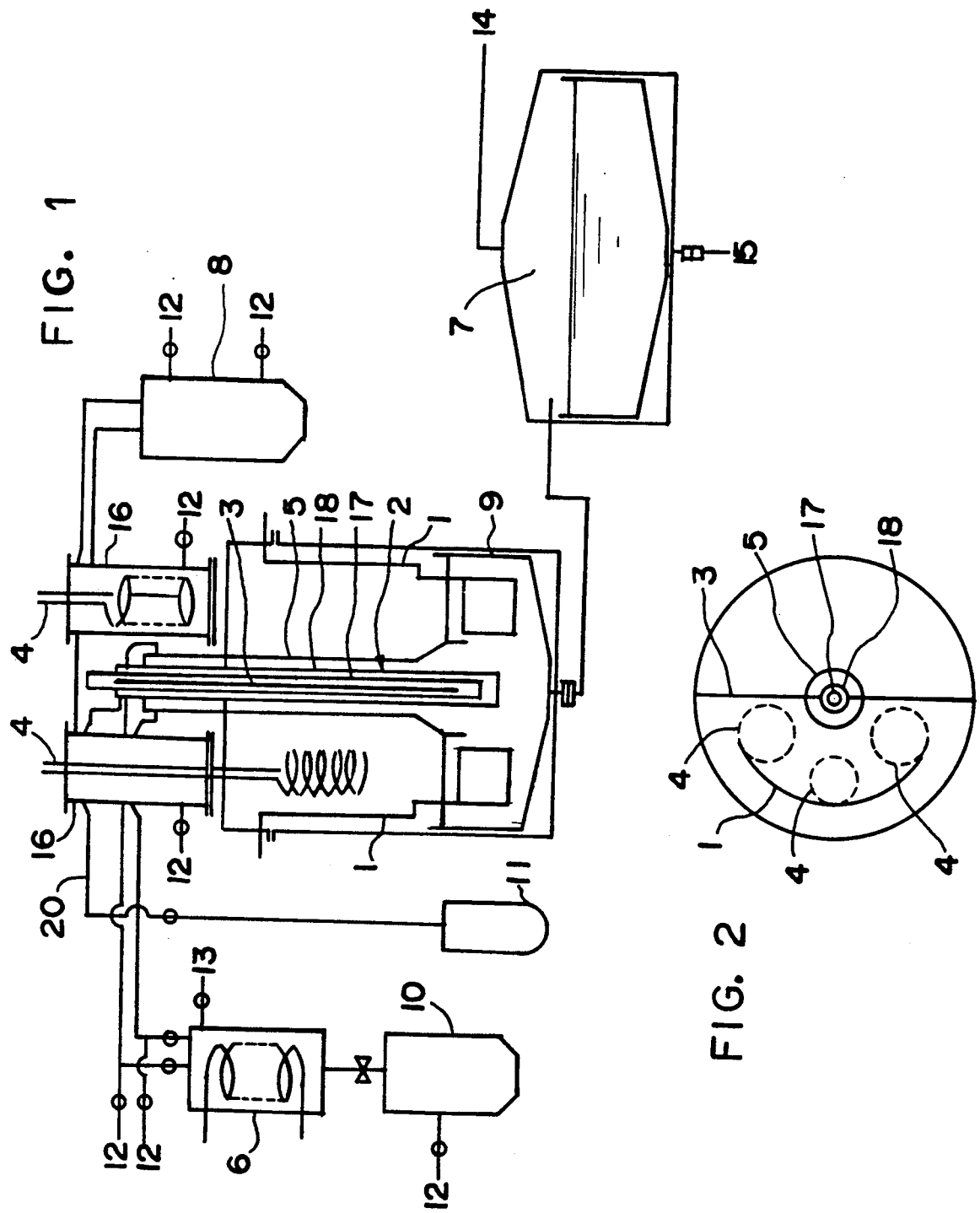

PROCESS FOR SEPARATION OF HAFNIUM TETRACHLORIDE FROM ZIRCONIUM TETRACHLORIDE

BACKGROUND OF THE INVENTION

The present invention relates to a process for separation of hafnium tetrachloride from zirconium tetrachloride which produces zirconium tetrachloride with a low hafnium content suitable for use as a raw material for the production of reactor grade zirconium metal and hafnium tetrachloride with a high hafnium content with high yield.

Zirconium ore contains generally about 2~4 wt % of hafnium. As hafnium tetrachloride is slightly more stable than zirconium tetrachloride for the chlorination reaction of both oxides, the concentration of hafnium tetrachloride in the chlorides is almost the same as that of the ore. Zirconium tetrachloride containing hafnium tetrachloride in natural ratio is used as a starting material for production of zirconium and hafnium metals. As the thermal neutron absorption cross section of hafnium is very high, a hafnium content in zirconium used for a reactor must be less than 100 ppm. Besides, hafnium is an excellent control material for a reactor because of high absorption of neutron.

Conventionally in commercial processes for separation of hafnium from zirconium there is a solvent extraction process which uses zirconium tetrachloride as a starting material and hexon as a solvent (J. W. Ramsey, W. K. Whitson Jr. Production of zirconium at Y-12, AEC Report Y-817, Oct. 12, 1951) and a distillation process in which vapors of zirconium tetrachloride and hafnium tetrachloride are absorbed selectively by salts such as aluminum chloride and are separated continuously from each other in a distilling column (French Patent No. 7340395, Japanese Patent Publication No. 20279 of 1978, Japanese Patent Provisional Publication No. 184732 of 1984).

In the former the running cost is high owing to its low recovery of solvent and chemicals used. In the latter the running cost is low, however, a huge distiller is required and its maintenance cost is high. A patent somewhat related to the present invention is U.S. Pat. No. 2,791,485 in which zirconium tetrachloride is reduced to trichloride for separation by the use of a reducing agent, but this process is not yet commercialized owing to the difficulty in separation of the reducing agent.

BRIEF SUMMARY OF THE INVENTION

An object of the present invention is to provide a process for separation of hafnium tetrachloride from zirconium tetrachloride in which zirconium and hafnium are separated respectively from zirconium tetrachloride containing hafnium tetrachloride in natural ratio and zirconium tetrachloride with a hafnium content of less than 100 ppm and hafnium tetrachloride with a zirconium content of less than 25 wt % are obtained as products.

The present invention provides a process for separation of hafnium tetrachloride from zirconium tetrachloride comprising of the following steps:

(a) dissolving zirconium tetrachloride containing hafnium tetrachloride in natural ratio in a molten salt, (b) producing zirconium trichloride containing a lower hafnium content than that of said zirconium tetrachloride at a cathode by the first phase electrolysis of said zirconium tetrachloride in said molten salt under maintenance of an initial concentration of said zirconium tetrachloride by supplying the chloride to said molten salt, (c) next, using as an anode said cathode on which said zirconium trichloride was produced in the former electrolysis and another cathode, (d) producing said zirconium trichloride with a lower hafnium content at said another cathode by the second phase electrolysis of said zirconium tetrachloride at a constant concentration of said zirconium tetrachloride in said molten salt by supplying the chloride in a similar manner as in the first phase electrolysis and evolving gaseous zirconium tetrachloride with a high pressure by oxidizing said zirconium trichloride, which was produced on said anode in the former electrolysis, (e) separating and recovering said evolved zirconium tetrachloride as zirconium tetrachloride with a low hafnium content, (f) further producing said zirconium trichloride with a lower hafnium content on the cathode and said zirconium tetrachloride with a low hafnium content on the anode by changing over polarities of said cathode and said anode when said zirconium trichloride on said anode decreases, (g) subsequently repeating continuously the second phase electrolysis similar to above, (h) on the other hand, transferring said hafnium tetrachloride highly concentrated in said molten salt to a separate vessel at the end of said second phase electrolysis when a vapor pressure thereof reaches an expected value less than about 1/10 of an equilibrium pressure of said zirconium tetrachloride in said molten salt, and (i) separating said highly concentrated hafnium tetrachloride by temperature rise of said molten salt containing said highly concentrated hafnium tetrachloride transferred already to said separate vessel.

The molten salt used in the present invention is composed of one kind or more than two kinds of compounds selected from the group consisting of alkali metal chlorides (LiCl, NaCl, KCl, RbCl, CsCl), alkaline earth chlorides ($BeCl_2$, $MgCl_2$, $CaCl_2$, $SrCl_2$, $BaCl_2$), and/or alkali metal fluorides (LiF, NaF, KF, RbF, CsF), alkaline earth fluorides ($BeF_2$, $MgF_2$, $CaF_2$, $SrF_2$, $BaF_2$).

Thus, the features of the present invention are as follows:

(1) Zirconium tetrachloride with a low hafnium content and highly concentrated hafnium tetrachloride are separated respectively with high efficiency from zirconium tetrachloride containing hafnium in natural ratio by a combination of the first phase electrolysis and the second phase electrolysis without using any organic solvent and reducing agent.

(2) Secondary reaction products are seldom produced and the loss of zirconium tetrachloride is also extremely small.

(3) In the evaporation-recovery step of zirconium tetrachloride with a low hafnium content, no huge distiller is required. Thus the scale of the whole equipment is comparably small.

DETAILED DESCRIPTION OF THE INVENTION

The present invention will be explained in more detail by the following description taken in connection with the accompanying drawing wherein:

FIG. 1 shows a longitudinal sectional view of an apparatus used in an embodiment of the present invention;

FIG. 2 shows a transverse sectional view of electrolytic cell 9 of FIG. 1 (electrode 1 and condensing coil 4 of the right side are not illustrated);

Figure 3:
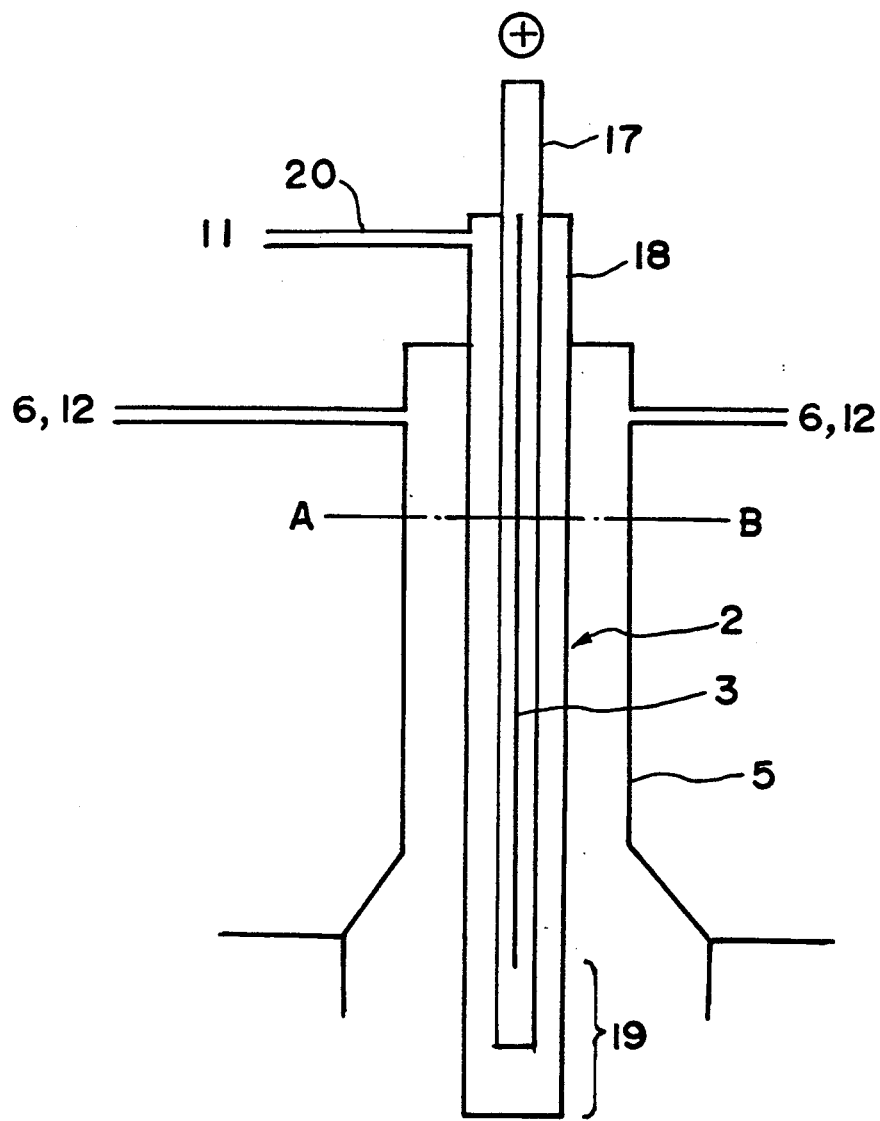
FIG. 3 shows a sectional view of the upper part and lower part of center electrode 2 of which the details are omitted in FIG. 1 and FIG. 2.
Figure 4:
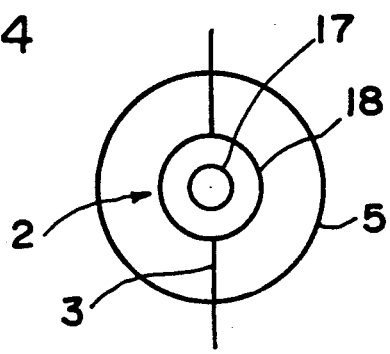
FIG. 4 shows a A-B sectional view of FIG. 3.

Arrangement of electrode 1 may vary according to the size of electrolytic cell 9. In FIG. 1, two sets of electrodes 1,1 along the wall of electrolytic cell 9 and center electrode 2 used as a cathode in the first phase electrolysis for production of zirconium trichloride are illustrated, and in the upper part of the electrolytic cell 9, a space between electrodes 1,1 is divided by partition wall 3. In the respectively divided spaces, condensing coils 4,4 are set up.

Untreated zirconium tetrachloride is supplied from gas introducing pipe 5 surrounding center electrode 2 and the pressure of zirconium tetrachloride supplied is adjusted and controlled by the temperature of reservoir 6 for sublimation of zirconium tetrachloride containing hafnium.

In the first phase electrolysis of zirconium tetrachloride, zirconium trichloride with a lower hafnium content is produced at a cathode by electrolytic reduction of zirconium tetrachloride using either of two electrodes 1,1 as a cathode and center electrode 2 as an anode. Center electrode 2 is composed, as shown in FIG. 3, of graphite or carbon-made anode 17 and anode jacket 18. In the lower part 19 in FIG. 3 of anode jacket 18, there is a small hole through which the molten salt passes and chlorine gas evolved at anode 17 is sent to chlorine gas reservoir 11 of FIG. 1 through a conduit pipe 20. In the second phase electrolysis using one electrode 1 of electrodes 1,1 of FIG. 1, on which zirconium trichloride with a lower hafnium content is produced during the first phase electrolysis as an anode and the other electrode 1 as a cathode, zirconium trichloride with a lower hafnium content is produced at a cathode by electrolysis of zirconium tetrachloride in the molten salt and gaseous zirconium tetrachloride with a low hafnium content is evolved on the anode by electrolytic oxidation of zirconium trichloride with a lower hafnium content. When the concentration of zirconium trichloride on the anode decreases due to the evolution of zirconium tetrachloride by electrolytic oxidation, the polarities of the electrodes are exchanged and the second phase electrolysis is repeated so as to increase this concentration of zirconium trichloride with a lower hafnium content.

Zirconium tetrachloride with a low hafnium content evolving from the anode is condensed by condensing coil 4 at the upper part of electrode 1 used as an anode. During this repeated electrolysis hafnium tetrachloride is concentrated in the molten salt. When a hafnium content of the concentrated hafnium tetrachloride reaches an estimated value, in which the vapor pressure of hafnium tetrachloride is less than 1/10 of a partial pressure of zirconium tetrachloride in the molten salt, the repeated electrolysis, i.e. second phase electrolysis is ceased. In the case where the repeated electrolysis is carried out in a molten salt composed of NaCl-KCl at about 640° C., the supply of zirconium tetrachloride is stopped at a concentration of hafnium tetrachloride in the molten salt in the range from 2 to 5 wt % and the repeated electrolysis is concluded. That is, the supply of zirconium tetrachloride is ceased, when the vapor pressure value of hafnium tetrachloride, which has become concentrated in the electrolytic bath, reaches about 1/10 of that of the dissolved zirconium tetrachloride. The second phase electrolysis is continued until most of the zirconium trichloride produced at the second cathode is oxidized and evolved, after which the repeated electrolysis is concluded. Then the molten salt containing the hafnium tetrachloride is transferred to separate vessel 7 and condensing coil 4 is pulled up to housing cylinder 16 as shown in the right side of FIG. 1.

The condensing coil 4 pulled up is heated to about 350° C., and zirconium tetrachloride with a low hafnium content is transported to a reservoir 8. The whole apparatus is maintained in an atmosphere of inert gases such as argon, nitrogen, etc. (less than 2 atmospheric pressure). FIG. 1 shows introducing part 12 of inert gas and exhausting part 13 thereof. In the electrolysis, the molten salt composed of the compounds already mentioned and containing zirconium tetrachloride is used as an electrolytic bath in the temperature range of 450°~750° C. and a concentration of the zirconium tetrachloride is selected to keep the equilibrium vapor pressure of less than 1 atmospheric pressure.

During the electrolysis zirconium tetrachloride, which is refined from sublimation vessel 10 of raw zirconium tetrachloride and already supplied to reservoir 6, is introduced under a constant pressure through gas introducing pipe 5 in FIGS. 1, 2 and 3 from the upper part of the electrolytic cell 9. At this time, the pressure of the zirconium tetrachloride supplied is preferably kept slightly higher than the equilibrium partial pressure of the zirconium tetrachloride in the molten salt. And zirconium tetrachloride is supplied from the cathode side during the second phase repeated electrolysis. In the first phase electrolysis, when graphite or carbon rod is used as an anode 17 contained in a center electrode 2 and chlorine gas evolves, the chlorine gas is recovered by chlorine trap 11.

When a substance prepared by mixing and firing $SiO_2$, alkali metal silicate or alkaline earth silicate and zirconium oxide with carbon and pitch is placed in a basket (made of graphite, nickel, stainless steel or more noble materials in chlorination potential than the above mentioned fired substance composed of carbon and oxides and used as anode 17, chlorination of the above mentioned oxides occurs at the anode and the electrolysis is carried out without evolution of chlorine gas. In this case, anode jacket 18 in FIG. 2 and 3 is unnecessary.

After the end of the second phase electrolysis, the remaining zirconium tetrachloride and highly concentrated hafnium tetrachloride are transferred to separate vessel 7 in FIG. 1 and evaporated from the molten salt by heating. The substance evaporated is recovered through conduit pipe 14 in a reservoir (not illustrated in FIG. 1) as highly concentrated hafnium tetrachloride. The molten salt transferred to separate vessel 7 is taken out from drain pipe 15 to be reused as an electrolytic bath.

Figure 5A:
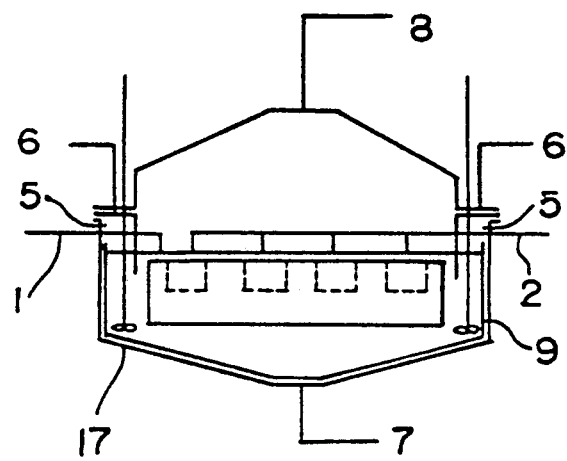
FIG. 5 shows a longitudinal sectional view of square-shaped electrolytic cell used in another embodiment of the present invention.
Figure 5B:
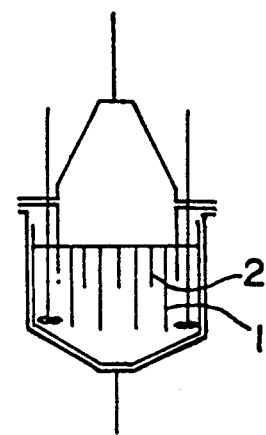
Figure 6:
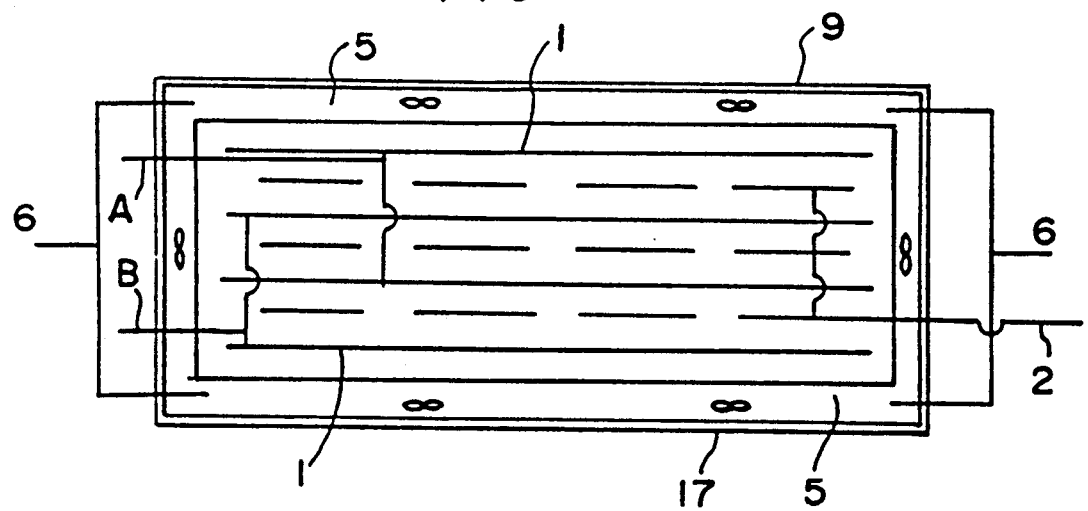
FIG. 6 shows a transverse sectional view of FIG. 5.

FIG. 5 (a) shows a longitudinal view of a square-shaped electrolytic cell used in another embodiment of the present invention, and FIG. 5 (b) shows a side view thereof and shows only the arrangement of the electrodes. FIG. 6 shows a vertical sectional view of FIG. 5 (a). In FIG. 6, one of each pair of electrode 1 is referred to A and the other to B. In FIG. 6 both sides of an electrode of 1 A in the third row from the top and an electrode of 1 B in the second row work as counter electrodes respectively on both sides and the whole is composed of three pairs of electrode 1 having different polarities.

Further, it is easy to increase a number of the pair of electrode 1. Center electrode 2 used in the first phase electrolysis exists in three rows. This center electrode 2 is not used in the second phase repeated electrolysis and so does not hinder the electrolysis in the immersion state. In the case where a graphite or carbon electrode is used as an electrode of this type, the anode jacket (not illustrated) is utilized.

Either above mentioned anode composed of graphite or carbon or fired zirconium oxide with carbon is used as center electrode 2, but in large-size cells the fired anode composed of carbon and zirconium oxide is preferable.

Gas introducing pipe 5 of FIGS. 5 and 6 is situated at the periphery of cell 9 and supplies refined zirconium tetrachloride from reservoir 6 in FIG. 1 for refined zirconium tetrachloride. In FIGS. 5 and 6 agitator 21 is illustrated. In the cell of this type the number of A B pair of electrode 1 can be easily increased. Chlorides of alkali metals and alkaline earth metals form double chlorides (for example, $Na_2ZrCl_6$) with zirconium tetrachloride. Kipouros and Flengas determined vapor pressures of the double chlorides composed of alkali metal and zirconium or hafnium and showed that the vapor pressures of double chlorides are lower than those of zirconium tetrachloride and hafnium tetrachloride themselves respectively and that the vapor pressure of each double chloride containing hafnium is lower than that of zirconium. These phenomena are though to be due to the formation of $ZrCl_6^{2-}$ ion and $HfCl_6^{2-}$ ion respectively [G. J. Kipouros and S. N. Flengas, CAN. J. CHEM. VOL. 59, p 990(1981); VOL. 61, p 2, 183(1983)].

In the present invention, free energies of dissolution in NaCl-KCl (50:50 mol) of zirconium tetrachloride and hafnium tetrachloride were determined from standard electrode potential values of zirconium tetrachloride and hafnium tetrachloride in NaCl-KCl (50:50 mol) molten salt at 700°~850° C. (infinite dilution basis) [T. SAKAKURA, T. KIRIHARA, DENKA, VOL. 36, p 305, 320] and standard free energy values of the respective solids thereof, and thereby respective activity in NaCl-KCl molten salt based on the solids was determined. Further, formulas of the vapor pressures of zirconium tetrachloride and hafnium tetrachloride in NaCl-KCl molten salt were determined from empirical formulas of the vapor pressures of the respective solids.

Consequently, it was concluded that in the concentration of less than 28 mol %, the vapor pressure of zirconium tetrachloride became higher at the same concentration than that of hafnium tetrachloride and the difference in the vapor pressures thereof increased contrary to the case of zirconium tetrachloride and hafnium tetrachloride in phase.

The reason is considered due to higher stability of $HfCl_6^{2-}$ ion in the molten salt than that of $ZrCl_6^{2-}$ ion.

Since such a difference in the vapor pressures occurs in the molten salt containing alkali or alkaline earth elements which form such complex ions as mentioned above, a separation efficiency by distillation is higher in the molten salt forming the above mentioned complex ions than in the solid mixture.

The difference of the vapor pressures of zirconium tetrachloride and hafnium tetrachloride dissolved in NaCl-KCl molten salt and those of the solids at the same temperature are shown in Table 1. In the result of examples mentioned afterward, the equilibrium vapor pressures of zirconium tetrachloride and hafnium tetrachloride in molten salts indicated to be much lower than those of the calculated values, because the calculated values contained errors of the above mentioned free energy values and of the standard electrode potentials, which were extrapolated values from measured potentials. As zirconium tetrachloride with a lower hafnium content than that in molten salt which is produced at the anode mentioned in item 1 has a vapor pressure near 1000 times as large as the equilibrium pressure of the solids as shown in Table 1, it is evident that it evolves rapidly with high speed in gaseous state.

In case of NaCl-KCl molten salt of which temperature is about 640° C., the separation efficiency becomes better when the concentration of zirconium tetrachloride is about 6 wt % and the concentration limit of hafnium tetrachloride in the molten salt is less than 5 wt %.

Table 1 shows the vapor pressures (mmHg) of zirconium tetrachloride and hafnium tetrachloride and those thereof dissolved in NaCl-KCl (50:50 mol) by 6 wt % at 640° C.

TABLE 1

| $ZrCl_4$ | $HfCl_4$ | 6 wt % $ZrCl_4$  mmHg | 6 wt % $HfCl_4$ |
|---|---|---|---|
| 700510 | 1107870 | 757.5 | 126.3 |

The features of the electrolytic reaction in the separation process of the present invention will be explained.

In the case of carbon anode the reaction of the first phase electrolysis for obtaining zirconium trichloride with a lower hafnium content is as follows:

$$2ZrCl_4 = 2ZrCl_3 + Cl_2 \qquad [1].$$

Zirconium trichloride with a lower hafnium content is produced at the cathode and chlorine gas evolves at the anode.

On the other hand, in the case of the fired anode composed of zirconium oxide and carbon, the following reaction is a main reaction:

$$ZrO_2 + C + 3ZrCl_4 = 4ZrCl_3 + CO_2 \qquad [2].$$

At the anode the chlorination of zirconium oxide is carried out and $ZrCl_4$ produced is dissolved in the molten salt. At the cathode, zirconium trichloride with a lower hafnium content is produced. When $ZrO_2$ in the anode decreases, the reaction [1] follows. Therefore, when the anode is exchanged before evolution of chlorine gas, the electrolysis can be carried out without chlorine evolution.

The anode used up is crushed and regenerated by removing some of the carbon and adding fresh zirconium oxide, carbon and pitch.

In the case of the fired anode of $SiO_2$ or silicate the reaction is as follows:

$$SiO_2 + C + 4ZrCl_4 = 4ZrCl_3 + SiCl_4 + CO_2 \quad [3]$$

Similarly as in [1] and [2], zirconium trichloride with a lower hafnium content is produced at the cathode and $SiCl_4$ and $CO_2$ evolve at the anode in gaseous state.

The reactions of hafnium tetrachloride corresponding to those of [1], [2] and [3] are as follow:

$$2HfCl_4 = 2HfCl_3 + Cl_2 \quad [1']$$

$$ZrO_2 + C + 4HfCl_4 = 4HfCl_3 + ZrCl_4 + CO_2 \quad [2']$$

and $$SiO_2 + C + 4HfCl_4 = 4HfCl_3 + SiCl_4 + CO_2 \quad [3']$$

As zirconium oxide contains usually 2~4 wt % of hafnium oxide, the following reaction:

$$HfO_2 + C + 3HfCl_4 = 4HfCl_3 + CO_2 \quad [4]$$

is thought to be possible but the probability of this reaction is smaller than that of [2'].

In the second phase repeated electrolysis the electrolytic reaction of [1] occurs as $ZrCl_4 = ZrCl_3 + Cl$, and at the cathode zirconium trichloride is yielded and chlorine atom at the anode reacts with zirconium trichloride on the anode, resulting in a production of zirconium tetrachloride with a low hafnium content. As the reactions at the anode are $$Cl^- = Cl + e$$

and $$Cl + ZrCl_3 = ZrCl_4,$$

thus chlorine gas does not evolve.

In the second phase electrolysis the electrolytic reaction corresponding to [1] is [1'], that is $$HfCl_4 = HfCl_3 + Cl.$$

Concerning the conditions that the electrolysis can be carried out without reduction of hafnium tetrachloride to trichloride, it will be explained as an example on NaCl-KCl molten salt.

Standard electrode potentials of trichloride and tetrachloride of zirconium and hafnium in NaCl-KCl (50:50 mol) molten salt were already obtained in a temperature below 850° C. as the following equations [T. SAKAKURA and T. KIRIHARA, DENKA, VOL. 36, p305, p320, 1968].

For hafnium $$E^i_{Hf/Hf^{3+}} = -(2.97 - 8.5 \times 10^{-4} T),$$

and $$E^i_{Hf/Hf^{4+}} = -(2.7 - 6.1 \times 10^{-4} T).$$

For zirconium $$E^i_{Zr/Zr^{3+}} = -(2.68 - 6.9 \times 10^{-4} T),$$

and $$E^i_{Zr/Zr^{4+}} = -(2.477 - 6.52 \times 10^{-4} T),$$

where Ei indicates a standard electrode potential based on infinite dilution, and European convention is used for the sign of electrode potentials.

Using the standard electrode potentials above indicated and the standard free energy of $ZrO_2$, $SiO_2$, $HfO_2$, $SiCl_4$ and $CO_2$ differences of standard electrode potentials of the corresponding reactions between [1] and [1'], [2] and [2'], [3] and [3'], and [2] and [4] were obtained, and the values at 450° and 600° C. were shown in Table 2.

TABLE 2

The differences of the standard electrode potentials in the electrolytic reactions of $ZrCl_4$ and $HfCl_4$ in NaCl-KCl(50:50 mol)

| temperature | 1'-1 | 2'-2 | 3'-3 | 4-2 |
|---|---|---|---|---|
| | | volt | | |
| 450 | −0.52 | −0.52 | −0.52 | −0.32 |
| 600 | −0.62 | −0.62 | −0.62 | −0.42 |

The values of Table 2 show that in the first phase electrolysis and the second phase repeated electrolysis, there exists a potential difference which is enough to separate hafnium from zirconium trichloride. As this value is a difference of the standard potentials, it is a value corresponding to a case where $ZrCl_4$ or $HfCl_4$ in NaCl-KCl is assumed to exist in 100%. Therefore, as even at the end of the practical electrolysis the concentration of $ZrCl_4$ is higher than that of $HfCl_4$, the difference of the potentials is further larger than that shown in Table 2. Consequently, as in a practical case the electrolysis is carried out at the potential of less than the electrolytic potentials at which the reactions of the equations of 1', 2' and 3' occur, almost pure zirconium trichloride can be yielded at the cathode.

The present invention will be explained more concretely by the following examples. Examples 1, 2, 3 and 4 show respectively the case in which zirconium tetrachloride with a low hafnium content is separated by the second phase repeated electrolysis. Example 5 shows the case in which highly concentrated hafnium tetrachloride is recovered after the separation of zirconium tetrachloride with a low hafnium content. These examples do not limit the scope of the present invention.

EXAMPLE 1

By using a laboratory scale round-shaped electrolytic cell with condensing coil 4 on both sides and a center electrode 2 involving graphite anode 17 as shown in FIG. 1~FIG. 3, zirconium tetrachloride (3 wt % of hafnium content) is supplied from gas introducing pipe 5 to a molten salt, NaCl-KCl (45:55 mol) to keep the concentration of 6 wt % at 640° C. and electrolyzed. In the first phase electrolysis, one of electrodes 1,1 is referred to A electrode and the other to B electrode, zirconium tetrachloride is electrolyzed first to 12 A hr between A electrode and center electrode 17 and next to 2 A hr between B electrode and center electrode 17, to deposit zirconium trichloride on the respective electrode. Then, in the second phase electrolysis in which the current is kept at 5 A, the electrolysis of zirconium tetrachloride is carried out to 10 A hr for 5 times by using first A electrode as an anode and B electrode as a cathode and next B electrode as an anode and A electrode as a cathode, namely by exchanging the polarities of A and B electrodes alternately. Consequently zirconium tetrachloride with 95 ppm of hafnium content is obtained in an average rate of 23.7 g/hr.

EXAMPLE 2

By using the apparatus similar to that of Example 1, adding 5 wt % of KF to NaCl-KCl (50:50 mol) molten salt and keeping the concentration of zirconium tetrachloride (0.18 wt % of hafnium content) in 8 wt %, the first phase and second phase electrolysis similar to those of Example 1 are carried out at 640° C., consequently 26 g/hr of zirconium tetrachloride with 100 ppm of hafnium content is obtained.

EXAMPLE 3

By using a square-shaped electrolytic cell containing 3 pairs of electrode 1 shown in FIG. 5 and FIG. 6, zirconium tetrachloride (0.18 wt % of hafnium content) is electrolyzed at 580° C. in NaCl-KCl (45:45 mol) molten salt.

In the first phase electrolysis, zirconium tetrachloride is electrolyzed first to 188 A hr by using A electrode as a cathode and next to 37 A hr by using B electrode as a cathode. Then, in the second phase electrolysis in which the current is kept at 150 A, zirconium tetrachloride is repeatedly electrolyzed for 8 times by exchanging alternately the polarities of A and B electrodes of electrode 1,1 every hour, consequently 6.1 kg of zirconium tetrachloride with 100 ppm of hafnium content is obtained.

EXAMPLE 4

By using the square-shaped electrolytic cell with 3 pairs of electrode 1 and NaCl-MgCl$_2$-KCl (20:40:40) molten salt, zirconium tetrachloride (0.18 wt % of hafnium content) is electrolyzed at 580° C. in the first phase electrolysis, namely first to 30 A hr by using A electrode as a cathode and next to 6 A hr by using B electrode as a cathode. In the second phase electrolysis, zirconium tetrachloride is electrolyzed at 20 A repeatedly for 8 times by exchanging alternately the polarities of A and B electrodes of electrode 1,1 every hour. Consequently 800 g of zirconium tetrachloride with 100 ppm of hafnium content is obtained.

EXAMPLE 5

By using the same laboratory scale round-shaped electrolytic cell as that of Example 1 shown in FIG. 1~FIG. 3 with graphite-made electrodes 1,1 and NaCl-KCl (45:55 mol) molten salt, zirconium tetrachloride containing 3 wt % of hafnium tetrachloride is kept at the concentration of 6 wt % by supplying from gas introducing pipe 5 and is electrolyzed in the first phase electrolysis without using the center electrode 2, namely first to 1.3 A hr by using one of electrodes 1,1 as an anode and next to 0.2 A hr by changing the polarities of the electrodes 1,1 to deposit zirconium trichloride. In the second phase electrolysis, zirconium tetrachloride is electrolyzed repeatedly 35 times, namely first to 0.9 A hr by using the same polarities of electrodes 1,1 as those of the first phase electrolysis and the next to the end also to 0.9 A hr by exchanging the polarities thereof. In the end of the second phase electrolysis, the supply of zirconium tetrachloride from reservoir 6 for refined zirconium tetrachloride is stopped and the electrolytic cell is filled with an argon atmosphere. The electrolysis is further carried out to 1 A hr and then concluded.

Zirconium tetrachloride with 100 ppm hafnium content of 150 g is recovered in condensing coil 4. After pulling up the electrodes 1,1 and putting down a new condensing coil 4, 46 g of hafnium tetrachloride with 25% wt of zirconium tetrachloride is recovered by raising the temperature to 850° C. under low pressure argon atmosphere about 1 mmHg.

EFFECT OF THE PRESENT INVENTION

The present invention shows the following effects by adopting a combination of the first phase electrolysis and the second phase electrolysis, namely a combination of the molten salt electrolysis and the exchange of polarities of the electrodes as its constitution.

(1) Zirconium and hafnium can be respectively separated and recovered with high efficiency. A hafnium content of zirconium tetrachloride separated is remarkably low and is able to reduce less than 100 ppm. A zirconium content of hafnium tetrachloride separated is also able to reduce to less than 25 wt %.

(2) In the present invention, the problems in conventional techniques due to the use of organic solvent or reducing agent do not exist, and the production of secondary products including chlorine gas and the loss of zirconium tetrachloride is extremely small. Moreover, since no huge distiller for zirconium tetrachloride and hafnium tetrachloride is required, the scale of the whole equipment is comparably small.

What is claimed is:

1. A process for a separation of hafnium tetrachloride from zirconium tetrachloride comprising the following steps of:

(a) introducing zirconium tetrachloride containing about 2–4 wt % of hafnium tetrachloride into an electrolytic cell equipped with a pair of first and second cathodes, and a third electrode and filled with a molten salt;

(b) dissolving the zirconium tetrachloride of step (a) in the molten salt of step (a) to make an electrolytic bath;

(c) running a first phase electrolysis, i.e. electrolytic reduction of the dissolved zirconium tetrachloride under maintenance of an initial concentration of the zirconium tetrachloride by supplying zirconium tetrachloride of step (a) to the electrolytic bath;

(d) producing zirconium trichloride containing a lower hafnium content than that of the dissolved zirconium tetrachloride of steps (b) and (c) at a first cathode;

(e) running a second phase electrolysis using the pair of first and second cathodes, but switching the first cathode to become an anode, and using the second cathode;

(f) supplying the zirconium tetrachloride to the second cathode side of step (e);

(g) producing the zirconium trichloride of a lower hafnium content than that of the dissolved zirconium tetrachloride at the second cathode and evolving gaseous zirconium tetrachloride at the anode by electrolytic oxidation of the zirconium trichloride produced in the first phase electrolysis;

(h) recovering the evolved zirconium tetrachloride as zirconium tetrachloride with a lower hafnium content than that of the dissolved zirconium tetrachloride and the zirconium trichloride produced at the second cathode in step (g);

(i) subsequently continuing the second phase electrolysis as set forth in steps (e), (f), (g) and (h) by changing over polarities of the second cathode and the anode, when a concentration of zirconium trichloride at the anode decreases;

(j) ceasing the supply of zirconium tetrachloride of step (f) when the vapor pressure value of hafnium tetrachloride, which has become concentrated in the electrolytic bath reaches about 1/10 of that of the dissolved zirconium tetrachloride, and continuing the second phase electrolysis until most of the zirconium trichloride produced at the second cathode is oxidized and evolved;

(k) transferring the electrolytic bath to a separate vessel; and (l) separating the concentrated hafnium tetrachloride from the molten salt by raising the temperature of the transferred electrolytic bath to about 850° C.

2. The process of claim 1, wherein the molten salt is composed of one kind of compound selected from the groups consisting of alkali metal chloride, alkaline earth chlorides, alkali metal fluorides, and alkaline earth fluorides.

3. The process of claim 1, wherein the molten salt is composed of one kind or more than two kinds of compounds selected from the groups consisting of alkali metal chlorides, alkaline earth chlorides, alkali metal fluorides, and alkaline earth fluorides.

4. The process of claim 1, wherein the molten salt is composed of NaCl-KCl.

5. The process of claim 4, wherein the electrolysis is carried out at a temperature of about 640° C.

6. The process of claim 1, wherein the evolved zirconium tetrachloride produced in steps (h), (i) and (j) has a hafnium content of less than about 100 ppm and the hafnium tetrachloride separated in step (l) has a zirconium tetrachloride content of less than about 25 wt %.

* * * * *

UNITED STATES PATENT AND TRADEMARK OFFICE
CERTIFICATE OF CORRECTION

PATENT NO. : 5,009,751
DATED : April 23, 1991
INVENTOR(S) : Tomoo Kirihara, et. al.

It is certified that error appears in the above-indentified patent and that said Letters Patent is hereby corrected as shown below:

On the Title page, item [57]
<u>In the Abstract</u>:

Line 14, change "trichloride" to --tetrachloride--.;

line 22, change "zinc" to --zirconium--;

line 24, change "valve" to --value--.

Column 2, line 19, change "anode" to --cathode--.

Column 3, line 24, change "a cathode" to --an anode--.

Column 5, line 43, change "though" to --thought--;

line 68, before "phase" insert --solid--.

Signed and Sealed this

Twenty-eighth Day of September, 1993

Attest:

BRUCE LEHMAN

*Attesting Officer*     *Commissioner of Patents and Trademarks*